May 30, 1933. C. L. KENNEDY 1,912,207
INDUCTION MOTOR
Filed Jan. 5, 1929
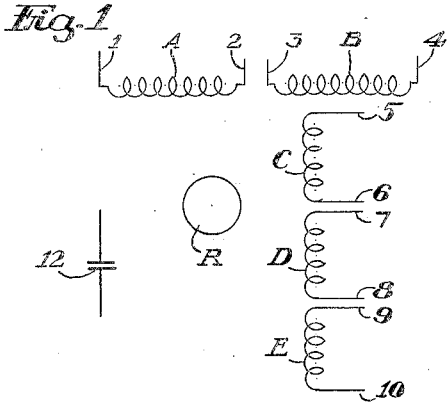
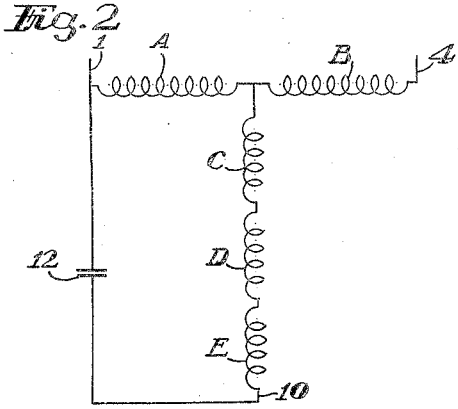
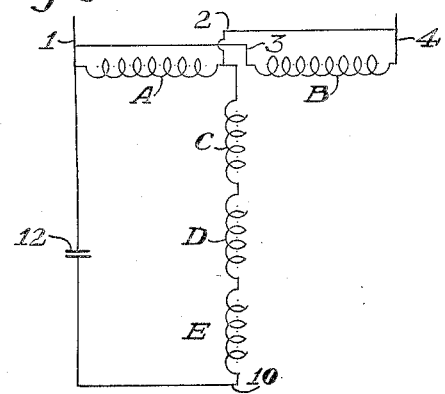
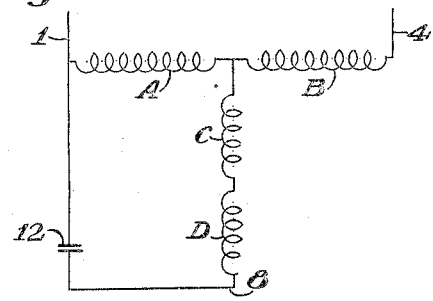
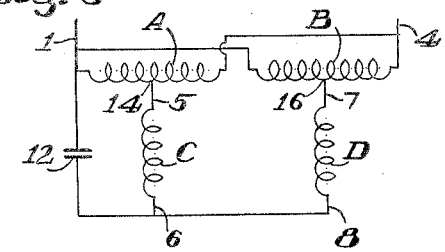
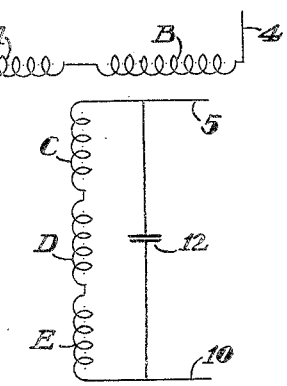
Witness
Helmar Van Dine
Inventor
Carlton L. Kennedy
by Van Everen Fish
Hildreth & Geary
Attys Patented May 30, 1933

1,912,207

UNITED STATES PATENT OFFICE

CARLTON L. KENNEDY, OF BRAINTREE, MASSACHUSETTS, ASSIGNOR TO THE HOLTZER-CABOT ELECTRIC COMPANY, OF ROXBURY, MASSACHUSETTS, A CORPORATION OF MASSACHUSETTS

INDUCTION MOTOR

Application filed January 5, 1929. Serial No. 330,498.

The present invention relates to induction motors.

In manufacturing stock electric motors, it is desirable to construct the motors so that they will operate under as many different conditions as possible.

The object of the present invention is to provide an induction motor which may be operated on single, two, or three-phase circuits, and on different voltages. To this end, the present invention consists of the induction motor hereinafter described and particularly defined in the claims.

In the accompanying drawing illustrating the preferred form of the invention, Fig. 1 is a diagram of the motor; Fig. 2 is a diagram showing the connections of the windings for single-phase operation at high voltage; Fig. 3 is a diagram showing single-phase connections for low voltage; Fig. 4 is a diagram showing three-phase connection for high voltage; Fig. 5 is a diagram showing three-phase connections for low voltage; and Fig. 6 is a diagram showing connections of the motor for operation in a two-phase circuit.

The illustrated embodiment of the invention comprises a motor having a rotor R and two sets of windings which are displaced from each other by an angle approximating 90 electrical degrees. One set of windings, which may be termed the main windings, comprises the two windings A and B having respectively the terminals 1 and 2, and 3 and 4. The windings A and B are similarly constructed and are wound in the same phase relationship. The other set of stator windings comprises the three windings C, D and E, having terminals 5 and 6, 7 and 8, and 9 and 10 respectively. The windings C, D and E are all in the same phase relationship with each other and are displaced in space quadrature from the windings A and B. Taking the winding A as a basis, the winding B has the same number of turns as the winding A. The windings C and D are similar to each other, each having approximately 86.6% of the number of turns of the winding A. The winding E is wound with 26.8% of the number of turns of the winding A. A condenser 12 is also provided for single-phase operation.

When operated as a single-phase motor, the connections are made to form a condenser induction motor of the type described in the co-pending application of Kennedy, Serial No. 330,499, filed January 5, 1929. The motor when connected in single-phase is adapted for operation on either of two voltages. In either case, the condenser circuit including the condenser 12 and the windings C, D and E in series, is connected in parallel with the winding A. For high voltage, the windings A and B are connected in series, as shown in Fig. 2. The line is connected to the terminal 1 of windings A and terminal 4 of winding B. This connection is useful, for example, in a 220 volt circuit.

For single-phase low voltage connection, the windings A and B are connected in parallel, as shown in Fig. 3, the condenser circuit being still maintained in parallel to the winding A. The line, which may be 110 volt circuit, is connected to the terminals 1 and 4. The operation of this motor under either voltage is described in the co-pending application above referred to.

For three-phase connection, at high voltage, the windings A and B are connected in series, as shown in Fig. 4. The windings C and D are connected in series, the terminal 5 of winding C being connected to the series connection between windings A and B. The winding E is not employed. The three-phase line is connected to terminals 1, 4, and 8. The condenser 12 is not necessary to be employed, but may be connected, if desired, across one phase, in which case the power factor is somewhat improved.

For three-phase operation under a voltage one-half of that used in the Fig. 4 connection, the windings A and B are connected in parallel with each other, as shown in Fig. 5. The quadrature windings C and D are connected to mid-taps 14 and 16, respectively, of the windings A and B. The terminals 6 and 8 together form one connection to one phase of the line, the other two phases being connected to the terminals 1 and 4.

As before, the condenser 12 may be connected across one phase. It will be seen that, in effect, the windings A and C together form a three-phase circuit in complete parallelism with the three-phase circuit formed by the windings B and D. If desired, either of the quadrature windings may be omitted, resulting in a slight unbalancing of the circuit because of the decreased transfer of energy to the third phase.

It will be seen that in the Fig. 4 connection, the voltages induced in the windings C and D together will be 1.732 times the voltage induced in either the winding A or B when the motor is running. Inasmuch as the voltages in the windings C and D are at approximately right angles to the voltages in windings A and B, the voltage which exists between terminals 1 and 8 and the voltage between terminals 4 and 8 will both be equal in magnitude but differing in phase from each other by 120° and also differing from the voltage between terminals 1 and 4 by a similar angle. The connections are such, therefore, that the motor properly operates on a balanced three-phase line. Similar conditions prevail in the connections shown in Fig. 5, with the exception that all voltages are one-half of their Fig. 4 values.

For operation on a two-phase line, the windings A and B are connected in series and one phase of the line is connected to terminals 1 and 4. The other phase of the line is connected to windings C, D and E in series. The total number of turns in windings C, D and E is equal to the combined turns of windings A and B. The condenser may be connected across one phase, if desired. This connection is shown in Fig. 6.

The ratios given above for the number of turns in the different windings are the theoretical ratios for balanced operation on either two or three-phase circuits, that is to say, when such ratios are employed and the motor is operated on a two or three-phase circuit, as shown in Fig. 6 or Fig. 4, the windings will all tend to take equal currents. However, in some constructions, it is desirable to increase the turns on the windings C and D, in order that a greater voltage may be induced in them and a slightly less current permitted to be taken from the line. The reason for this slight increase in ratio is as follows: If the motor is intended to operate under some conditions as a single-phase motor, the condenser 12 cannot be of sufficient capacity to permit the magnitude of the current in the condenser circuit to be as large as the current in the main windings A and B. Accordingly, for single-phase operation, the windings A and B must take the greater part of the load. In order to effect economy of manufacture, therefore, the condenser windings C, D, and E may be of smaller wire because of the smaller current which passes through them. However, if such a motor were then connected for three-phase or two-phase operation, the turns ratios being as above indicated, nearly equal currents would flow in all of the windings and the quadrature windings C, D and E might become overloaded. In order to limit the currents in the quadrature windings so that the windings A and B may take the same proportion of the load under multi-phase operation as under single-phase operation, the turns ratio is slightly increased above the theoretical value. This results in the inducing of larger voltages in the windings C and D, and therefore prevents passage of sufficient current to damage the windings. The operation results in some unbalancing of the circuit, but not sufficient to reduce the starting torque materially or to place too great a proportionate load on the windings A and B. The turns ratio of winding E may also be slightly increased above its theoretical value, if desired, but this is usually unnecessary because of the fact that in two-phase operation, it is connected in series with the other quadrature winding.

It will be understood that the windings C and D may be constructed as a single winding except when the parallel connection necessary for the low voltage three-phase operation of Fig. 5 is required.

Having thus described the invention, what is claimed is:

1. An induction motor comprising a rotor, a stator having a main winding and a quadrature winding wound with wire of smaller size and with a turns ratio slightly greater than 86.6% of the turns of the main winding and connected to the mid-point of the main winding, whereby in operation as a three-phase motor the quadrature winding will take less current than the main winding, and a condenser connected between the quadrature winding and the main winding to permit operation of the motor as a single-phase motor.

2. An induction motor comprising a rotor, a stator having a pair of similar main windings and a pair of similar quadrature windings, the windings of each pair being adapted for series connection or for parallel connection to operate on three-phase, high voltage, or low voltage circuits, the quadrature windings having a turns ratio slightly greater than the theoretical ratio for balanced three-phase operation, whereby the quadrature windings take less current than the main winding, a condenser connected between the quadrature windings and the main windings to permit operation of the motor as a single-phase condenser motor, and an additional quadrature winding to be placed in series with the other quadrature windings and having a sufficient number of turns to make the total number of quadrature turns slightly greater than the number of turns in the main windings, whereby the motor may be operated as a two-phase motor.

3. An induction motor comprising a rotor, a stator, two windings displaced in quadrature from each other, one of said windings having slightly more than 86.6% of the turns of the other and adapted to be connected to the mid-point of the other winding to permit operation as a three-phase motor with lines connected to the ends of the windings, and a condenser adapted to be connected between the free end of the first-mentioned one of said windings and one end of said other winding to permit operation as a single phase condenser induction motor, and an additional quadrature winding to be placed in series with the smaller winding and having a sufficient number of turns to make the total number of turns in the two sets of windings approximately equal, whereby the motor may be operated as a two-phase motor, with separate phases independently connected to the separate windings.

4. An induction motor comprising a rotor, a stator, two windings displaced in quadrature from each other, one of said windings wound with wire of smaller size and having slightly more than 86.6% of the turns of the other and connected to the mid-point of the other winding, to permit operation as a three-phase motor with lines connected to the ends of the windings, and a condenser adapted to be connected between ends of both windings to permit operation as a single-phase condenser induction motor with lines connected to the ends of the larger winding.

5. An induction motor comprising a rotor, a stator having a main winding and a quadrature winding to be connected to separate phases of a two-phase supply, the quadrature winding being wound with wire of smaller size and having a slightly greater number of turns than the main winding, means for connecting one of the windings to the other winding, and a condenser to be connected between the windings to operate the motor as a single-phase condenser motor.

In testimony whereof I have signed my name to this specification.

CARLTON L. KENNEDY.